United States Patent [19]
Greenfield et al.

[11] Patent Number: 6,020,934
[45] Date of Patent: Feb. 1, 2000

[54] MOTION ESTIMATION ARCHITECTURE FOR AREA AND POWER REDUCTION

[75] Inventors: James D. Greenfield, Binghamton; Barbara A. Hall, Endwell; John A. Murdock, Apalachin; Agnes Y. Ngai, Endwell; Stephen P. Pokrinchak, Owego, all of N.Y.

[73] Assignee: International Business Machines Corporation, Armonk, N.Y.

[21] Appl. No.: 09/046,291

[22] Filed: Mar. 23, 1998

[51] Int. Cl.[7] .................................................. H04N 7/34
[52] U.S. Cl. ................................. 348/699; 348/416
[58] Field of Search .................................. 348/416, 402, 348/413, 699; H04N 7/34

[56] References Cited

U.S. PATENT DOCUMENTS

| | | | |
|---|---|---|---|
| 4,369,463 | 1/1983 | Anastassiou | 348/411 |
| 5,608,656 | 3/1997 | Purcell | 708/203 |

*Primary Examiner*—Howard Britton
*Attorney, Agent, or Firm*—Scully, Scott, Murphy & Presser; John R. Pivnichny

[57] ABSTRACT

A method for compensating for reduced picture quality when combining a multi-chip encoding chipset into a single integrated semiconductor IC. The method includes additional functions provided on the single IC to compensate for the negative effects on picture quality produced as a result of rounding 8 bit luminance pixel data to 5 bits, where the luminance data values are supplied as input to the search function. The additional functions are collectively referred to as motion biasing and are applied to influence the choice of a "best match" motion type, which is well known in the art. The biasing is performed by the addition of a weight factor to a total difference result that is calculated by the search function. The biasing is applied only for the purpose of influencing the choice of a reference frame that is not necessarily the frame which produces an optimal motion vector, but rather will result in using fewer bits to encode macroblocks.

47 Claims, 4 Drawing Sheets

MOTION ESTIMATION ARCHITECTURE FOR AREA AND POWER REDUCTION

BACKGROUND OF THE INVENTION

1. Field of the Invention

The present invention generally relates to apparatus for encoding visual images, including spatial (Intra-pictures) and temporal (inter-picture) compression, that is redundancy within a picture and redundancy between pictures. Specifically, this invention relates to an encoder which combines the functionality of a three chip encoder chipset into a single chip while maintaining original picture quality associated with the three chip encoder.

2. Discussion of the Prior Art

Within the past decade, the advent of world-wide electronic communications systems has enhanced the way in which people can send and receive information. In particular, the capabilities of real-time video and audio systems have greatly improved in recent years. In order to provide services such as video-on-demand and video conferencing to subscribers, an enormous amount of network bandwidth is required. In fact, network bandwidth is often the main inhibitor in the effectiveness of such systems.

In order to overcome the constraints imposed by networks, compression systems have emerged. These systems reduce the amount of video and audio data which must be transmitted by removing redundancy in the picture sequence. At the receiving end, the picture sequence is uncompressed and may be displayed in real-time.

One example of an emerging video compression standard is the Moving Picture Experts Group ("MPEG") standard. The MPEG committee was formed in 1988 to establish standards for coding moving pictures and associated audio information on digital media. The first phase of their work was completed in 1991, namely ISO standard 11172, which defines MPEG-1. MPEG-1 was defined to cover a continuous bitrate of about 1.5 Mbit/sec. The second phase has defined ISO standard 13818-2, called MPEG-2. The syntax for MPEG-2 is very robust and permits various types of compression options, such as the handling of interlaced video sources and frame or field based coding. The MPEG data stream consists of a number of structured layers that are defined in the MPEG-2 standard. The video layer contains the coded information required to represent the video portion of the data stream. The IBM Encoder chip set produces only the data for the video layer, in compliance with the MPEG-2 video standard (ISO 13818-2).

Within the MPEG standard, video compression is defined both within a given picture and between pictures. Video compression within a picture is accomplished by conversion of the digital image from the time domain to the frequency domain by a discrete cosine transform, quantization, and variable length coding. Video compression between pictures is accomplished via a process referred to as motion estimation and compensation. Motion estimation covers a set of techniques used to extract the motion information from a video sequence and is well known in the art. The process of motion estimation effectively reduces the temporal redundancy in successive video frames by exploiting the temporal correlation (similarities) that often exists between successive frames. Higher compression ratios are achievable by virtue of exploiting the temporal redundancy between pictures. Motion compensated compression is achieved through the use of P and B pictures.

In general, each frame in a video sequence is one of three picture types I, P, or B, where "Intra frames" or "I" pictures are encoded and transmitted whole, and do not require motion vectors to be defined. These "I" pictures serve as a source of motion vectors. There are also "Predicted pictures" or "P" pictures which are formed by motion vectors from a previous picture and can serve as a source of motion vectors for further pictures. There are still further "Bidirectional frames" or "B" pictures which are formed by motion vectors from two other pictures, one past and one future, and cannot serve as a source of motion vectors. Motion vectors are generated from "I" and "P" pictures, and are used to form "P" and "B" pictures.

In the motion estimation process for P-pictures, the luminance portion of each 16×16 pixel current macroblock (CMB) contained in the picture currently being encoded is compared against the luminance portions of a set of 16×16 pixel reference macroblocks (RMBs) contained within a search window in a previously encoded reference picture (e.g. past reference frame) to determine a best match macroblock. Once a best match macroblock is selected a difference result is computed which represents the difference between the current macroblock (CMB) value and the chosen "best match" macroblock (RMB).

For B-pictures, the luminance portion of each CMB is compared against the luminance portions of a set of RMBs contained in each of the previously encoded past and future pictures. In addition, the luminance portion of each CMB is compared against the luminance portion of the RMB formed by averaging the best past and future picture search results. These three B-picture search results (past, future and bidirectional) are computed to determine the overall best match. As was true in the P-picture case, once a best match macroblock is selected a difference result is computed which represents the difference between the current macroblock (CMB) value and the chosen "best match" macroblock (RMB).

Two types of information result from the motion estimation and compensation process: motion vector(s) and a motion compensated prediction error (MCPE) macroblock. The motion vectors pinpoint the location of the luminance portion of the best match RMB. The motion vectors predict where a macroblock of pixels will be in a prior and/or subsequent picture. The MCPE macroblock is comprised of pixel difference data which results from subtracting both the luminance and chrominance components of the best match RMB from the CMB. This information is encoded and inserted into the compressed bitstream in cases where the encoder determines that coding of the inter (motion compensated) macroblock is more efficient than coding the intra (non-motion compensated) macroblock.

The IBM encoder chip set utilizes standard motion compensation and estimation techniques as part of an overall process of compressing real-time digital video input into MPEG-2 compliant bitstreams. The architecture is scalable in that either one, two or all three chips can be used for different types of MPEG-2 compression applications. The encoder consists of three chips, an Intra chip (I), a refine chip (R), and a search chip (S). The chips can be operated in a one, two or three chip configuration. The I chip is the base encoding chip and is required for all three configurations. All communication between the encoder and the external system is through the I chip. In a three chip configuration, the I, R, and S chips will produce IPB encoded pictures. This results in a lower number of bits to transport/store compared to I or IP encoded pictures. IPB encoding fits into many applications and especially those that require the lowest bit rate/smallest bandwidth such as DVD and DBS. Other applications include video distribution, and PC applications such as desktop publishing.

Given the diversity of applications required by the three chip configuration, it becomes increasingly desirable, from the point of view of the application card designer to combine the three chip chipset into a single chip to conserve circuit board space while maintaining the functionality of the original chipset.

A need therefore exists for an encoder which combines the functionality of encoder chip sets of the prior art into a single chip while maintaining the picture quality achieved by the prior art chip set.

SUMMARY OF THE INVENTION

It is therefore an object of the present invention to combine the functionality of a multi-chip encoder chip set into a single, reasonably sized encoder semiconductor IC while maintaining the picture quality achieved by the multi-chip encoder.

It is a further object of the present invention to decrease the power consumption required by the single encoder IC in proportion to the reduction in circuitry.

It is a still further object of the present invention to decrease the required external support memory of the single encoder IC in proportion to the reduction in circuitry.

It is still yet another object of the present invention to achieve improved performance in proportion to the reduction in circuitry.

In order to attain the above objects, according to the present invention, there is provided a single encoder chip which is capable of carrying out all of the functional requirements of the previous generation three chip encoder chip set in a reasonably sized semiconductor IC.

Accordingly, a method and apparatus is provided for combining a multi-chip encoder chip set into a single encoder semiconductor IC while maintaining the picture quality achieved by the multi-chip encoder. The combination of a multi-chip encoder chipset into one reasonably sized semiconductor IC is effected by modifying the input precision of certain pixel data associated with the search function. More particularly, the search function requires as input 16×16 macroblocks of pixel data including 8 bit luminance pixel data values. Internal to the search function, the method of the present invention rounds off each 8 bit luminance pixel received to a 5 bit pixel. The coarse search that is performed by the search function is now performed using 5 bit pixels. This round off operation effectively shrinks the circuitry associated with the search function to sixty-three percent, or ⅝ of its original size. The shrinkage results as a consequence of all internal registers, bus widths, arithmetic functions becoming multiples of 5 instead of 8. Reducing the luminance pixel values from 8 to 5 bits results in an overall chip cell count savings on the order of 187,000 cells.

In addition to the search function circuitry being reduced, the required SRAM needed to store the reference picture used by the search function is only 63% of its original requirement. With this reduced memory size comes a reduced data bus width which makes the memory interface narrower.

Other important benefits are realized as a consequence of reducing the search unit size requirement. With a reduction in circuitry, the power consumption is also proportionally reduced. A further derived benefit is that of improved performance. That is, as each stage of circuitry, latch to latch, is reduced in size (e.g. adders, buses, etc. are narrower) less time is required for a signal to propagate from latch to latch.

An undesired consequence of reducing the luminance pixel precision from 8 to 5 bits is a degradation on overall Signal to Noise Ratio (SNR) which translates directly into a degradation of picture quality. The method of the present invention compensates for this effect by supplying additional functions, not included in prior art configurations, which are added to raise the picture quality to a level commensurate with that of the prior art. These additional functions are collectively labeled "motion biasing". Motion biasing is accomplished by altering the "best match" selection logic to choose a reference macroblock that may not have the lowest difference data, as performed by the prior art, but will yield fewer encoded bits. The bits that are saved can then be used elsewhere in the bitstream.

As is well known in the art, the difference data is the sum of the absolute differences of the current macroblock and the reference macroblock. The difference data can have a maximum value of 'FF00' hex. The method of the present invention provides for bias registers that are 8 bits wide in an illustrative embodiment and are added to the low order 8 bits of the difference data registers. The maximum allowable bias value, as constrained by the 8 bit hardware, is 'FF' hex or 255 decimal. Given that the "best match" decision merely chooses the lowest difference data. Therefore, when bias is applied the choice can be altered only if the differences are within the bias amount. The present method also introduces bias via software (e.g. microcode) in the processor unit in addition to hardware registers.

Biasing can be applied in the method of the present invention to influence four choices: 1) The selection of either a past or future reference frame, 2) Biasing away from bidirectional frames 3) half pel vs. full pel results, and 4) frame vs. field motion type.

In summation, the combination of reduced input resolution and motion biasing compensation techniques in a single encoder chip effectively reduces the circuit board space requirements by the encoding process with associated reductions in power consumption and external memory support, while maintaining the overall picture quality achieved by a multi-chip encoder configuration.

The various features of novelty which characterize the invention are pointed out with particularity in the claims annexed to and forming a part of the disclosure. For a better understanding of the invention, its operating advantages, and specific objects attained by its use, reference should be made to the drawings and descriptive matter of which there are illustrated and described preferred embodiments of the invention.

In preferred embodiments of the present invention, the video compression standard is MPEG-2.

BRIEF DESCRIPTION OF THE DRAWINGS

Reference may now be had to the following detailed description of preferred embodiments of the invention, taken in conjunction with the accompanying drawings in which.

DETAILED DESCRIPTION OF THE PREFERRED EMBODIMENTS OF THE INVENTION

Although this invention is applicable to numerous and various types of digital video compression standards, it has been found particularly useful in the environment of the MPEG-2 standard. Therefore, without limiting the applicability of the invention to the MPEG-2 standard, the invention will be described in such environment. Furthermore, while the present invention has been found particularly useful in the environment of video data, and described in such environment, analogous methods can be applied to various other types of data, such as audio data.

Figure 1:
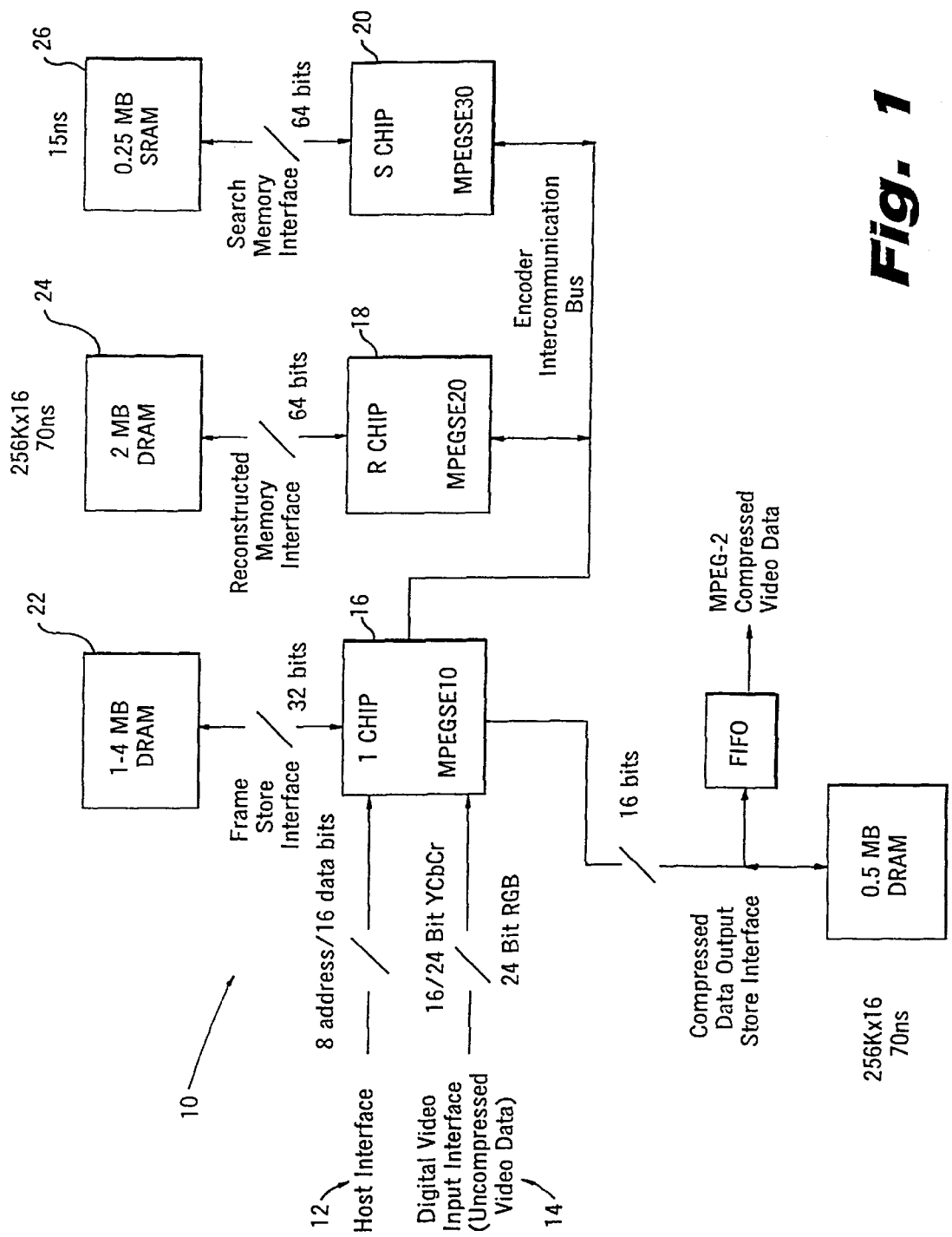
FIG. 1 illustrates a block diagram of the three-chip encoder chipset of the prior art.

Referring now to FIG. 1, the encoder configuration of the prior art 10 is illustrated. The encoder compresses real-time digital video into MPEG-2 compliant bitstreams. The architecture is scalable in that either one, two or all three chips can be used for different types of MPEG-2 compression applications. The chipset has direct interfaces to external DRAM 22 24 and SRAM 26. The encoder consists of three chips, I (Intra) 16, R (Refine) 18 and S (Search) 20. The I chip 16 is the base encoding chip and is required for all configurations. The S chip 20 provides a coarse search to be used in the motion estimation and compensation process, and the R chip 18 performs a refined search around the S chip search results. All communication between the encoder and the external system is through the I chip 16. A 16-bit generic host interface 12 allows system host communication with the encoder to control the encoding operation. The I chip 16 accepts digital pixel data 14 as input, and performs the compression function on each picture. In a one-chip configuration, a single I chip will produce I-only encoded pictures. In a two chip configuration, the I chip 16 and the R chip 18 work together to produce IP encoded pictures. Since IP encoded pictures require fewer bits to encode compared to I-only pictures to achieve the same visual quality, the resulting encoded bitstream can be transported/stored at a targeted lower bit rate. In a three chip configuration, the I 16, R 18 and S 20 chips will produce IPB encoded pictures. This results in a lower number of bits to transport/store compared to I or IP encoded pictures in order to achieve the same visual quality.

Data is input to the chip set in raster scan order. Both 16 and 24 bit YCbCr data 14 can be used. As previously stated the S chip 20 provides a coarse search. To carry out the coarse search the S chip 20 receives an input video stream comprising a plurality of video frames further comprising uncompressed digital pixel data organized as a plurality of macroblocks to be encoded. The macroblock layer is the last layer of the MPEG video data structure. A macroblock is composed of four 8×8 pixel blocks of luminance data and either two, or four, or eight 8×8 blocks of corresponding chrominance data. Most of the mathematical operations performed during compression, such as motion compensation and spatial redundancy removal, are performed at the macroblock and block layers. The MPEG-2 standard defines several types of macroblocks based on the composition of the macroblock structure in terms of luminance and chrominance blocks. The two common formats are: the 4:2:0 macroblock format and the 4:2:2 format. Irrespective of which format is utilized, each 8×8 pixel block of luminance data consists of a plurality of 8 bit luminance pixel data values.

The present invention achieves the benefits of a reduced chip size by rounding the 8 bit luminance pixel values to 5 bit values in the S chip 20 of the encoder. The conversion of luminance pixel data from 8 to 5 bits is carried out, in an illustrative embodiment, in hardware where an algorithm is utilized which looks at the third least most significant bit in the 8 bit value and if the bit value contained there is a one (1) the entire 8 bit value will be rounded up, otherwise the entire 8 bit value will be rounded down. Analyzing the third least most significant bit position in hardware is equivalent to evaluating the decimal value of the three least significant bits in the 8 bit value and determining whether the decimal value is greater than or equal to 4, if so the 5 bit value (which is the value of the 5 most significant bits of the 8 bit pixel value) is rounded up, otherwise the value is rounded down.

Figure 2:
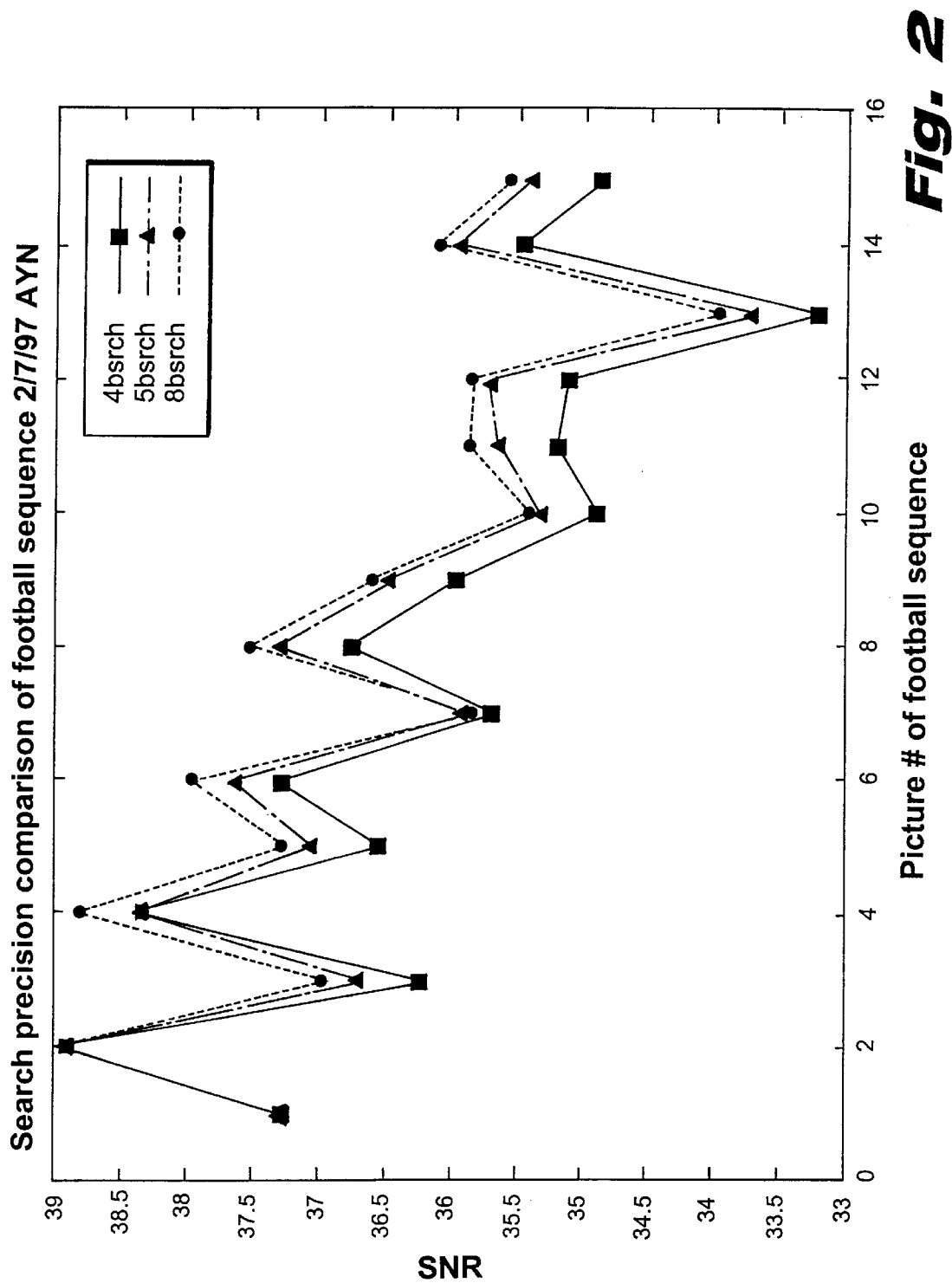
FIG. 2 illustrates how picture quality (SNR) degrades for three values of input luminance pixel data precision

FIG. 2 is a plot of signal to noise ratio (SNR) vs. an encoded stream of arbitrary digital video frames comparing three pixel graphs representative of pixel precisions of 8 bits, 5 bits, and 4 bits. The graphs illustrate that the SNR decreases as the number of bits per pixel decreased. However, the decrease is only incremental until the 4 bit pixel precision is used. At this point the SNR (e.g. picture quality) degrades precipitously. Given that the size of the search function is reduced in linear proportion to the precision of the luminance data, an optimal tradeoff is therefore achieved at 5 bits whereby the reduction in input precision from 8 to 5 bits achieves an acceptable reduction in overall chip dimension while yielding minimal picture degradation.

Figure 3:
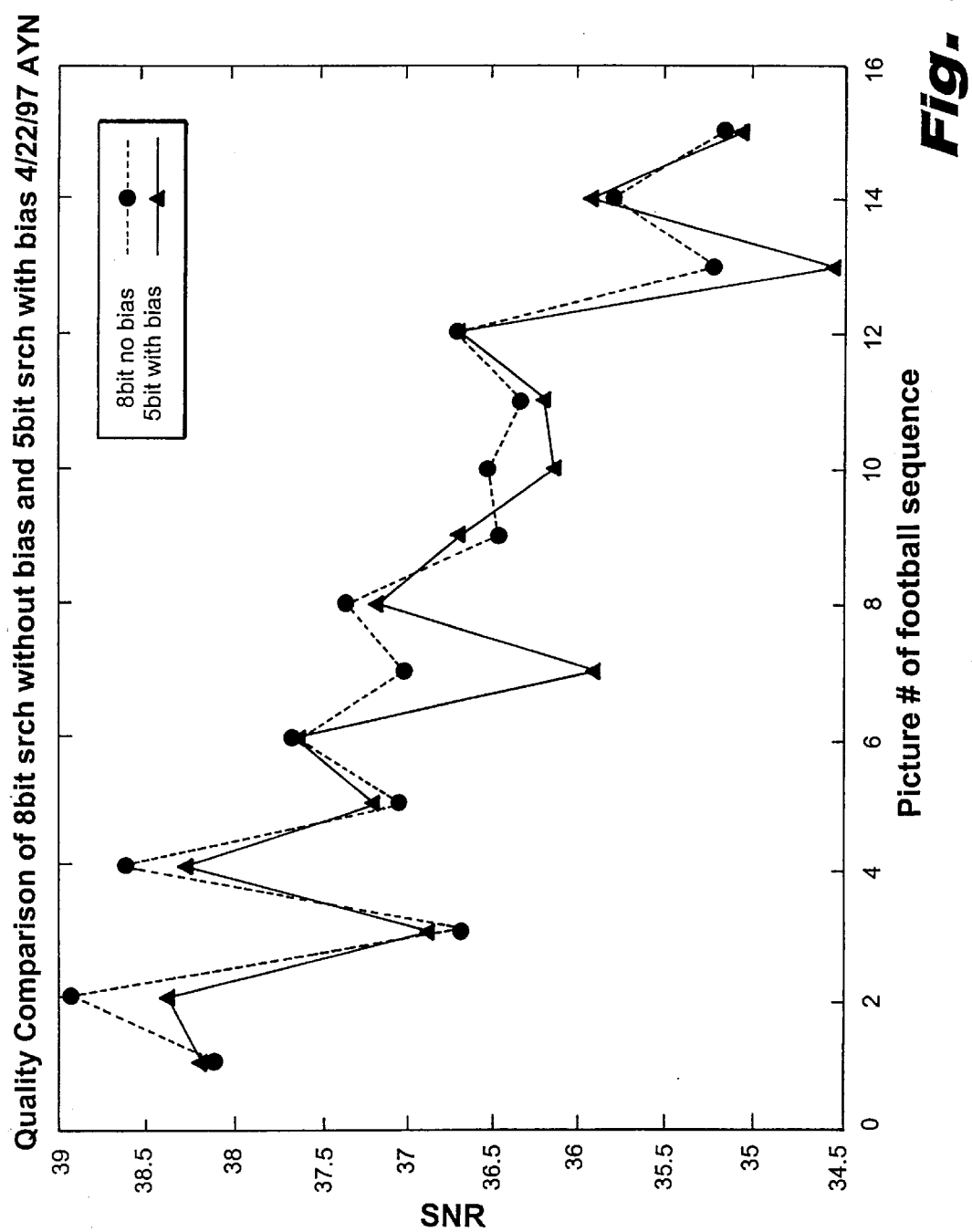
FIG. 3 illustrates the difference in picture quality (SNR) over conventional methods when using the method of the present invention.

FIG. 3 is a plot of SNR v. an encoded stream of arbitrary digital video frames. Two graphs are illustrated which describe how the application of motion biasing, which compensates for the degraded picture quality which results as a consequence of reducing the input precision from 8 to 5 bits, actually yields a superior picture quality to what is attainable with the conventional 8 bit precision without any motion biasing functions.

MOTION BIASING

As previously stated, to compensate for the picture degradation which results as a consequence of reducing the luminance pixel data precision from 8 to 5 bits, the method of the present invention includes a number of additional functions which are incorporated into the single chip.

Four additional functions are provided along with the single encoder semiconductor IC and are collectively referred to as motion biasing. Motion results which are supplied by the search function, S chip, can be biased in order to influence the choice of a best match motion type. The biasing is implemented by the addition of a weight factor to the total difference value that is supplied by the S function, but only for the purpose of choosing the best match. Biasing can be employed to influence four choices: 1) the selection of a past or a future reference frame, 2) biasing away from the selection of a bidirectional reference frame, 3) the selection of half pixel v. full pixel results, and 4) the selection of frame v. field motion type. In each case the weighting factors are added to the difference data before the best match choice is made. The weight factors effectively bias the "best match" selection logic to choose a reference macroblock that may not necessarily have the lowest difference data but, rather, will yield fewer encoded bits.

In the prior art a single best match macroblock is selected to minimize the difference result between the current macroblock (CMB) to be encoded and some reference macroblock (RMB) for the purpose of computing a motion vector. The selection of the RMB is made by searching inside a predefined window in a reference field/frame. By contrast, the method of the present invention requires that multiple searches be conducted to find multiple candidate "best match" macroblocks from which a single "best match" macroblock will be selected.

Table II below illustrates the number and type of searches required by the present method for selecting a single "best match" macroblock. At each row of the table, a description is provided of the particular reference field or frame to be searched to select a best match macroblock to the current macroblock (CMB) to be encoded. The particular field or frame to be searched depends upon both the picture type and encoding format. The Table is therefore organized into 4 subdivisions where each subdivision represents a particular combination of picture type, (i.e. I,P, or B) and encoding format, frame or field.

TABLE II

| CURRENT MACROBLOCK (CMB) ROW TO BE ENCODED | FRAME OR FIELD TO BE SEARCHED TO FIND A BEST MATCH MACROBLOCK TO (CMB) |
|---|---|
| P PICTURE TYPE & FRAME ENCODED | |
| 1 CURRENT FRAME VS. | REFERENCE FRAME |
| 2 CURRENT FIELD 1 VS. | REFERENCE FIELD 1 |
| 3 CURRENT FIELD 1 VS. | REFERENCE FIELD 2 |
| 4 CURRENT FIELD 2 VS. | REFERENCE FIELD 1 |
| 5 CURRENT FIELD 2 VS. | REFERENCE FIELD 2 |
| P PICTURE TYPE & FIELD ENCODED | |
| 6 CURRENT FIELD VS. | REFERENCE FIELD SAME PARITY |
| 7 CURRENT FIELD VS. | REFERENCE FIELD OPPOSITE PARITY |
| B PICTURE TYPE & FRAME ENCODED | |
| 8 CURRENT FRAME | PAST REFERENCE FRAME |
| 9 CURRENT FRAME | FUTURE REFERENCE FRAME |
| 10 CURRENT FRAME | BIDI REFERENCE FRAME |
| 11 CURRENT FIELD 1 | PAST REFERENCE (FIELD1 OR FIELD2) |
| 12 CURRENT FIELD 1 | FUTURE REFERENCE (FIELD 1 OR FIELD 2) |
| 13 CURRENT FIELD 1 | BIDI* REFERENCE (FIELD 1 OR FIELD 2) |
| 14 CURRENT FIELD 2 | PAST REFERENCE (FIELD1 OR FIELD2) |
| 15 CURRENT FIELD 2 | FUTURE REFERENCE (FIELD1 OR FIELD2) |
| 16 CURRENT FIELD 2 | BIDI REFERENCE (FIELD 1 OR FIELD 2) |
| B PICTURE TYPE & FIELD ENCODED | |
| 17 CURRENT FIELD | PAST REFERENCE SAME PARITY |
| 18 CURRENT FIELD | FUTURE REFERENCE SAME PARITY |
| 19 CURRENT FILED | BIDI REFERENCE SAME PARITY |
| 20 CURRENT FIELD | PAST REFERENCE OPPOSITE PARITY |
| 21 CURRENT FIELD | FUTURE REFERENCE OPPOSITE PARITY |
| 22 CURRENT FIELD | BIDI REFERENCE OPPOSITE PARITY |

*bidi reference frames are averages of past and future frames

The four divisions illustrated in Table II comprise: "P frame" pictures, "P field" pictures", "B frame" pictures, and "B field" pictures. As is well known in the art, for the purposes of removing spatial redundancy a "P" picture type involves a single reference frame, a past frame, to locate a "best match" macroblock. Whereas a "B" picture type references both a past and future frame. It is also well known in the art that a frame picture is composed of two fields, a top field and a bottom field. Whereas a field picture is comprised of only a single field. These characteristics are relevant to the method of the present invention.

The first division, "P frame" picture type, illustrates that 5 searches are required for determining a best match reference macroblock (RMB) to the current macroblock (CMB). The second division, "P field" picture type, represents a subset of the first division and illustrates that only 2 comparisons are required for a "P field" picture. The third division, "B frame" pictures require a total of nine comparisons as a consequence of B pictures referencing more than one reference frame. The last category, "B field" pictures require a total of 6 comparisons.

Each search, defined by the numbered rows of the table, will return a best match reference macroblock (RMB) whose difference result, computed as the sum of the absolute differences of the current macroblock (CMB) and the reference macroblock (RMB) is minimum. The computed difference results may then be altered by the method of the present invention, (e.g. adding weight factors) to influence the selection of an overall best match macroblock from among the candidate best match macroblocks returned from each search.

Rows 1–5 of Table II describe the required comparisons to encode macroblocks from a "P frame" type picture. Row 1 describes that a reference frame is searched to find a best match macroblock to a current macroblock defined in the current frame.

Row 2 of Table II illustrates a second required comparison for a "P frame" picture type. The comparison in this instance involves a field 1 current macroblock, which represents a subset of the frame macroblock defined at row 1. Row 3 also describes a field comparison with the distinction being that the reference field searched is field 2 and not field 1 as described at row 2.

Rows 4 and 5 describe comparisons similar to those described at rows 2 and 3 where the parity of the current and reference fields is opposite to that described at rows 2 and 3.

The second major table division is a subset of the first division and describes the required searches to encode macroblocks from a "P field picture". In this case only a single field is involved and the current macroblock in this field is compared with both a reference field of the same parity (e.g. current field 1 with reference field 1 or current field 2 with reference field 2), and a reference field of opposite parity (e.g. field 1 with field 2 or the reverse).

The third major table division describes a "B frame picture" type. It is well known that a B picture type, for the purposes of removing spatial redundancy, references both a past and a future reference frame. The number of comparisons are increased, as illustrated in the table, as a result. In addition to searching both a past and future reference frame, a bidi, or bidirectional frame, is searched which represents the average of both the past and future frames. The comparisons described at rows 8–16 are similar to those described in preceding columns, however, the search involves additional steps by virtue of the B picture referencing more than one reference frame.

The last major table division, "B field" pictures is a subset of the third subdivision "B frame" pictures. In this case only a single field needs to be searched to determine a best match macroblock.

Figure 4:
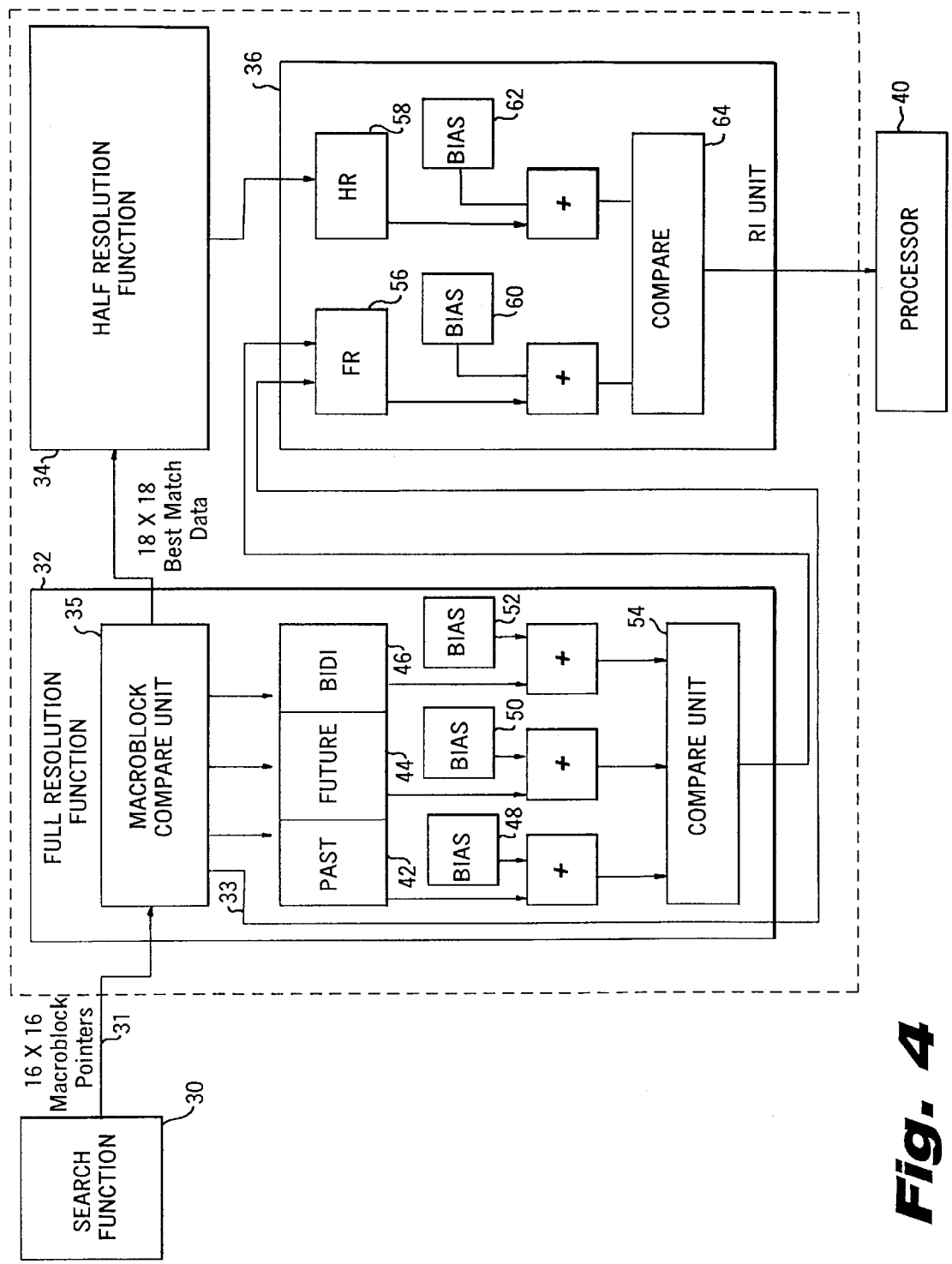
FIG. 4 is a functional block diagram showing an embodiment of hardware structure.

FIG. 4 is a block diagram of the functional units of the encoder which carry out the process of motion estimation and compensation. The Figure also illustrates how the weight factors (bias values) are applied in carrying out the method of the present invention. FIG. 4 shows three functional units, a search unit 30 coupled to a refine unit 38, and a processor 40 coupled to the refine unit 38. The refine unit 38 is broken out into its functional components including a full resolution function 32, a half resolution function 34, and an RI unit 36.

Referring now to the table in conjunction with FIG. 4, the first major subdivision of the table, "P frame" picture type is selected by example to illustrate the method of the present invention. It is observed at the table that 5 searches are required to satisfy the encoding of a macroblock of a "P frame" picture type. The search function 30 will perform the searches described at columns 1–5 of the table and determine a pointer, 5 in all, to each best match macroblock. Once determined, the search function 30 supplies the 16×16 macroblock pointers 31 to the full resolution module 32 of the refine unit 38. The full resolution module ( hereinafter FR), upon receiving the first pointer, retrieves the macroblock associated with the supplied pointer. The reference macroblock retrieved is a slightly expanded version of the macroblock pointed to by the pointer. That is, the macroblock retrieved is 24×18, slightly expanded in both the horizontal and vertical directions. More precisely, the retrieved macroblock is the 16×16 macroblock determined by the search function 30 expanded by +/− 4 lines in the horizontal direction and +/−1 line in the vertical direction.

The FR module then performs a refined search. The refined search iterates through every unique 16×16 pixel combination contained within the space defined by the 24×18 macroblock for comparison with the current 16×16 macroblock (CMB) to determine a "best match" full resolution macroblock. The best match macroblock is defined as the macroblock with the minimum difference result computed as the absolute value of the sum of the difference between each pixel in the (CMB) and every unique 16×16 pixel combination in the 24×18 macroblock.

Once determined, the minimal difference result is passed through the FR unit 33 directly to the RI unit 36 to be stored in the FR register 56 of the RI unit 36. In addition to the difference result, additional information is output to indicate that the difference result was obtained as a result of performing a frame search.

The comparison unit 64 in the RI unit 36 cannot occur until the half resolution unit 34 (hereinafter HR) supplies the half resolution search result to the RI unit 36. In the case of a frame search, the HR unit 34 receives two inputs from the FR unit 32; 1) a best match full resolution macroblock (16×16), and 2) the current macroblock (18×18). The HR unit 34 interpolates all adjacent pixels, both horizontally and vertically. This interpolating process allows for eight additional comparisons. That is, the current 16×16 macroblock will be compared with eight uniquely interpolated half resolution macroblocks. The eight interpolations are defined as 1) up ½ pel 2) down ½ pel 3) right ½ pel 4) left ½ pel 5) up ½ pel and right ½ pel 6) up ½ pel and left ½ pel 7) down ½ pel and right ½ pel 8) down ½ pel and left ½ pel. Each averaged macroblock will be compared with the current 16×16 macroblock supplied as input to determine the minimal difference result. Once a minimal difference result is determined from the eight comparisons, the macroblock associated with the minimal result is labeled the half resolution best match macroblock. The minimal difference result is supplied to the RI unit 36 unit to be compared with the full resolution difference result stored in the previous operation, see row 1 of the table.

Half pel v. Full pel

Once the RI unit registers have values for both the full and half resolution difference results, a bias may be supplied to one of the two 8 bit bias registers 60,62. Typical values supplied here are on the order of 1 or 2 to break tie situations and bias the selection made by the compare unit 64 towards the full resolution result thereby minimizing the number of bits in the stream.

Frame v. Field

The RI unit supplies the processor 40 with the results of the comparison for the frame search defined at row 1 of the table. Prior to processing the searches associated with rows 2 and 3 of the table, field searches, the processor must store the frame search different result and must postpone any Frame v. Field comparisons until the intermediate results of searches defined at rows 2–3 and 4–5 are performed.

Subsequent to the process steps associated with table row 1, the search unit will then perform the comparisons defined at rows 2–5 of the table. Each comparison will return a best match reference macroblock. The search unit will supply pointers to each of the 4 best match macroblocks to the FR unit as was done in the frame search. Using the supplied pointer values the FR unit will once again retrieve expanded versions of each of the 4 macroblocks, however, for a field search, the expanded macroblock constitutes a pixel block of dimension 10×24. As was performed in the frame search, each 10×24 reference macroblock will be compared with the current macroblock in the macroblock compare unit 35 of the FR unit 32. For each 10×24 reference macroblock, each unique 16×16 pixel combination will be analyzed for comparison with the current macroblock to determine a minimal difference result. The 16×16 pixel combinations associated with each minimal difference result are labeled best match field reference macroblocks.

The method takes the best match field macroblock obtained as a result of comparisons at rows 2 and 3 of the table and selects the minimum difference result among them to supply to the FR register 56 in the RI unit 36. This stored result is then compared against a half resolution frame result, computed in the same way as described for the frame search case.

The entire process described above for rows 2 and 3 are repeated again for rows 4 and 5. Subsequent to processing the searches for rows 4 and 5. the processor will now have stored three difference results associated with row 1 (frame result), rows 2–3 (1st field result) and rows 4–5 (2nd field result). The processor now has three values from which to make a Frame v. Field comparison. At this point, predetermined bias values may be applied at the processor 40, via software to influence the selection of frame or field as the reference.

The table also describes searches associated with "B frame" and "B field" pictures. The only procedural difference with respect to the method of the present invention is an additional comparison which occurs in the FR unit 32. In particular the result of the comparison from column 8 is stored in the past register 42 as a binary value of up to 16 bits. Similarly the results from the comparisons from rows 9 and 10 are stored in the future 44 and bidi 46 registers respectively. The compare unit 54 in the FR unit 32 compares the three register values and selects the minimal difference result. This minimal difference result is then supplied to the RI unit 36. The influence of bias will now be described for the remaining two of the four motion bias techniques.

Biasing away from bidi

The three way comparison performed in the FR unit involves a motion biasing function labeled "Biasing away from bidirectional frames". Note that the bidi register 46 can be loaded with a positive integer which will have the effect of tending to make the bidi choice lose more often in the three way comparison. To bias away from the bidi best match macroblock a positive integer value may be supplied to bias register 52 at the outset of the encoding process and remain in the register thereafter. The FR unit will recognize when it is processing a B picture, and will apply the bidi weight in that situation. When other than a B picture is being processed the bidi weight will be blocked. It is desirable to bias away from a bidi reference because if your best match from the three way comparison in the FR unit turns out to be a bidi reference there is a tendency to use more motion vectors because it is referencing two different pictures which implies the use of additional bits. Situations that involves the use of additional bits are undesirable and should be avoided.

Past vs. Future reference frame

Assume that a picture sequence to be encoded is as follows, I-B-B-P and that the first B picture is currently being encoded. The closest reference picture to the first B picture is the I picture. The next closest reference picture is the P picture, which is two pictures away. It is desirable to bias towards the closest reference picture to save bits. The closest reference picture to the first B picture is the I picture for the example shown. While the FR unit is capable of recognizing the fact that it is processing a B picture, it cannot further discern which reference picture is closer to each of that B picture. Microcode is supplied to make that determination. Accordingly, it will set the bias weight in the appropriate register to bias towards the closer reference, past or future picture, depending upon which B picture is being encoded. For example, in the case of processing the second B picture for the sequence I-B-B-P, a bias weight will be applied to bias register 42 thereby biasing the comparison towards the selection of the difference result contained in the future register 44. This is because the future register 44 contains the difference result associated with the P picture which is closer to the B picture currently being encoded. The only pre-processing step required for this past v. future function is to establish some number to supply to the bias register for biasing towards the closest reference. This can be determined experimentally.

It is understood by someone skilled in the art that other algorithm adjustments could be made in a similar manner without departing from the scope or spirit of the present invention. Furthermore, although the method and apparatus has been described with reference to MPEG2 video compression, it could be applied to other video compression techniques such as MPEG-1.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by Letters Patent is:

1. Apparatus for enhancing video frame quality comprising:
   bus means for receiving an input video stream comprising a plurality of video frames, wherein each frame comprises digital pixel data organized as a plurality of macroblocks;
   coarse search means for receiving the video frames and the macroblocks thereof, and performing a coarse search in a current frame to find one or more full resolution best match macroblocks;
   refined search means, coupled to said coarse search means, for performing a refined search in said current frame, generating a minimum full resolution best match macroblock and a corresponding minimum full resolution difference result;
   half resolution means, coupled to said refined search means, for generating a minimum half resolution best match macroblock and a corresponding minimum half resolution difference result; and
   resolution means for selecting the lesser of the minimum full resolution difference result and the minimum half resolution difference result.

2. The apparatus of claim 1, wherein said coarse search means receives as input luminance data pixel values with bit precision greater than 4 and less than 8.

3. The apparatus of claim 1, wherein said coarse search means receives as input luminance data pixel values of 5 bit precision.

4. The apparatus of claim 1, wherein said coarse search means searches for said one or more best match macroblocks in a search window on downsampled full pixel values.

5. The apparatus of claim 1, wherein said coarse search means searches for said one or more best match macroblocks in a search window on non-downsampled full pixel values.

6. The apparatus of claim 1, wherein the refined search means further comprises a full resolution unit for retrieving from memory, one or more full resolution best match macroblocks, generating for each of said best match macroblocks an associated full resolution difference result.

7. The apparatus of claim 6, wherein the full resolution unit further comprises a first bias means for biasing the value of said full resolution difference result.

8. The apparatus of claim 7, wherein each full resolution difference result is associated with one of a past, future, or bidirectional video frame.

9. The apparatus of claim 7, wherein the first bias means is supplied from a register.

10. The apparatus of claim 7, wherein the first bias means is a positive number.

11. The apparatus of claim 8, wherein the first bias means is applied to bias against the selection of said bidirectional video frame.

12. The apparatus according to claim 8, wherein said first bias is applied against said past reference frame when said future frame is temporally closer to said current frame.

13. The apparatus according to claim 8, wherein said first bias is applied against said future reference frame when said past frame is temporally closer to said current frame.

14. The apparatus of claim 6, wherein the full resolution unit further comprises comparison means for comparing two or more full resolution difference results to select the lesser of said two results.

15. The apparatus of claim 1, wherein said half resolution means generates one or more half resolution best match macroblocks by interpolating pixel data contained in said minimum full resolution best match macroblock.

16. The apparatus of claim 15, wherein said interpolation of pixel data includes interpolating all adjacent pixels both horizontally and vertically.

17. The apparatus of claim 1, wherein said resolution means includes a second bias means for biasing one of said minimum full resolution difference result and minimum half resolution difference result.

18. The apparatus of claim 17, wherein the second bias means is supplied from a register and is programmable.

19. The apparatus of claim 17, wherein the second bias means is a positive integer.

20. The apparatus of claim 17, wherein said resolution means includes comparison means for comparing said minimum full resolution difference result and said half resolution difference result to select the lesser of said two results.

21. The apparatus of claim 20, wherein said bias is applied against the selection of said half resolution difference result.

22. The apparatus of claim 1, wherein the search in each of said video frames is performed in one of an entire frame, a first field of the frame, or a second field of the frame.

23. The apparatus of claim 1, wherein the apparatus further comprises processor means for comparing the lesser of a minimum full resolution difference result from one of said entire frame, said first field of the frame, or second field of the frame.

24. The apparatus of claim 23, wherein a third bias is applied against the selection of said minimum full resolution difference result for said entire frame.

25. The apparatus of claim 23, wherein a third bias is applied against the selection of said minimum full resolution difference result for both said first field of the frame and second field of the frame.

26. A method for enhancing video frame quality comprising the steps of:
1) receiving an input video stream comprising a plurality of video frames, wherein each frame comprises digital pixel data organized as a plurality of macroblocks;
2) receiving the video frames and the macroblocks thereof, and performing a coarse search in one of the frames to find one or more full resolution best match macroblocks;
3) performing a refined search in said one of the frames, generating a minimum full resolution best match macroblock and a corresponding minimum full resolution difference result;
4) generating a minimum half resolution best match macroblock and a corresponding minimum half resolution difference result; and
5) selecting the lesser of the minimum full resolution difference result and the minimum half resolution difference result.

27. The method according to claim 26, wherein step 1 includes receiving as input luminance data pixel values with bit precision greater than 4 and less than 8.

28. The method according to claim 26, wherein step 1 includes receiving as input luminance data pixel values of 5 bit precision.

29. The method of claim 26, wherein step 2 further comprises searching for one or more best match macroblocks in a search window on downsampled full pixel values.

30. The method of claim 26, wherein step 2 further comprises searching for one or more best match macroblocks in a search window on non-downsampled full pixel values.

31. The method of claim 26, wherein step 3 further comprises retrieving from memory said one or more full resolution best match macroblocks, generating an associated full resolution difference result.

32. The method of claim 31, wherein step 4 further comprises a first bias means for biasing the value of said full resolution difference result.

33. The method of claim 32, wherein each full resolution difference result is associated with one of a past, future, or bidirectional video frame.

34. The method of claim 32, wherein the first bias means is supplied from a register and is programmable.

35. The method of claim 32, wherein the first bias means is a positive number.

36. The method of claim 33, wherein the first bias means is applied to bias against the selection of said bidirectional video frame.

37. The method according to claim 33, wherein said first bias is applied against said past reference frame when said future frame is temporally closer to said current frame.

38. The apparatus according to claim 33, wherein said first bias is applied against said future reference frame when said past frame is temporally closer to said current frame.

39. The method of claim 31, wherein step 4 further comprises comparison means for comparing two or more full resolution difference results.

40. The method of claim 26, wherein step 4 further comprises interpolating pixel data contained in said minimum full resolution best match macroblock.

41. The method of claim 40, wherein said interpolation of pixel data includes interpolating all adjacent pixels both horizontally and vertically.

42. The method of claim 26, wherein step 5 further comprises applying a second bias for biasing one of said full resolution minimum difference result and half resolution minimum difference result.

43. The method of claim 42, wherein the second bias is supplied from a register.

44. The method of claim 42, wherein the second bias is a positive integer value.

45. The method of claim 26, wherein said selecting step 5 includes the step of comparing for selecting the lesser of said minimum full resolution difference result and said half resolution difference result.

46. The method of claim 26, further comprising comparing the lesser of said minimum full resolution difference result from said entire frame, said first field of the frame, and said second field of the frame.

47. The method of claim 46, wherein a third bias is applied against the selection of said minimum full resolution difference result for said entire frame.

* * * * *